United States Patent [19]
Wilkinson et al.

[11] Patent Number: 5,757,973
[45] Date of Patent: May 26, 1998

[54] COMPRESSION OF IMAGE DATA SEPERATED INTO FREQUENCY COMPONENT DATA IN A TWO DIMENSIONAL SPATIAL FREQUENCY DOMAIN

[75] Inventors: James Hedley Wilkinson, Heathlands; Jonathan James Stone, Reading; Michael John Ludgate, Bordon, all of England

[73] Assignees: Sony Corporation, Tokyo, Japan; Sony United Kingdom Limited, Weybridge, England

[21] Appl. No.: 809,278

[22] Filed: Dec. 17, 1991

[30] Foreign Application Priority Data

Jan. 11, 1991 [GB] United Kingdom ............ 9100593
Aug. 8, 1991 [GB] United Kingdom ............ 9117168

[51] Int. Cl.$^6$ .................................................. G06K 9/36
[52] U.S. Cl. ........................ 382/246; 382/248; 358/432
[58] Field of Search .......................... 358/133, 136, 358/427, 433, 428, 432; 382/56, 240, 248, 246

[56] References Cited

U.S. PATENT DOCUMENTS

| 4,754,336 | 6/1988 | Nishizawa | 358/133 |
|---|---|---|---|
| 4,817,182 | 3/1989 | Adelson et al. | 382/56 |
| 4,821,119 | 4/1989 | Gharavi | 358/133 |
| 4,969,040 | 11/1990 | Gharavi | 348/398 |
| 5,021,091 | 6/1991 | Lee | 382/41 |
| 5,031,038 | 7/1991 | Guillemot et al. | 358/130 |

FOREIGN PATENT DOCUMENTS

| 283 715 A2 | 9/1988 | European Pat. Off. . |
|---|---|---|
| 339 589 A2 | 11/1989 | European Pat. Off. . |
| 413 570 A2 | 2/1991 | European Pat. Off. . |

OTHER PUBLICATIONS

Nasrabad; et al., "Image Coding Using Vector Quantization: A Review", IEEE Transactions on Communications, vol. 36, No. 8 Aug. 88 pp. 957–971.

IEEE Trans Comm., Com–34(3), (Mar. 1986) pp. 311–319.

*Primary Examiner*—Michael T. Razavi
*Assistant Examiner*—Jon Chang
*Attorney, Agent, or Firm*—William S. Frommer; Alvin Sinderbrand

[57] ABSTRACT

A data compression system decorrelates input data into sets of frequency component data. Different sets of frequency component data are entropy encoded using different coding tables matched to the data values characteristic of the sets of frequency component data they are used to compress. Matching the coding tables to the sets of frequency component data improves compression. The order in which the data values from within each set of frequency component data is fed to the entropy encoder is varied to exploit any intra-set correlation.

9 Claims, 8 Drawing Sheets

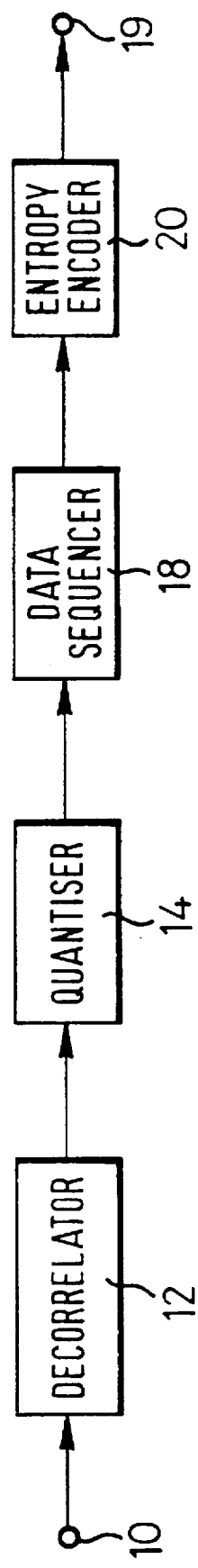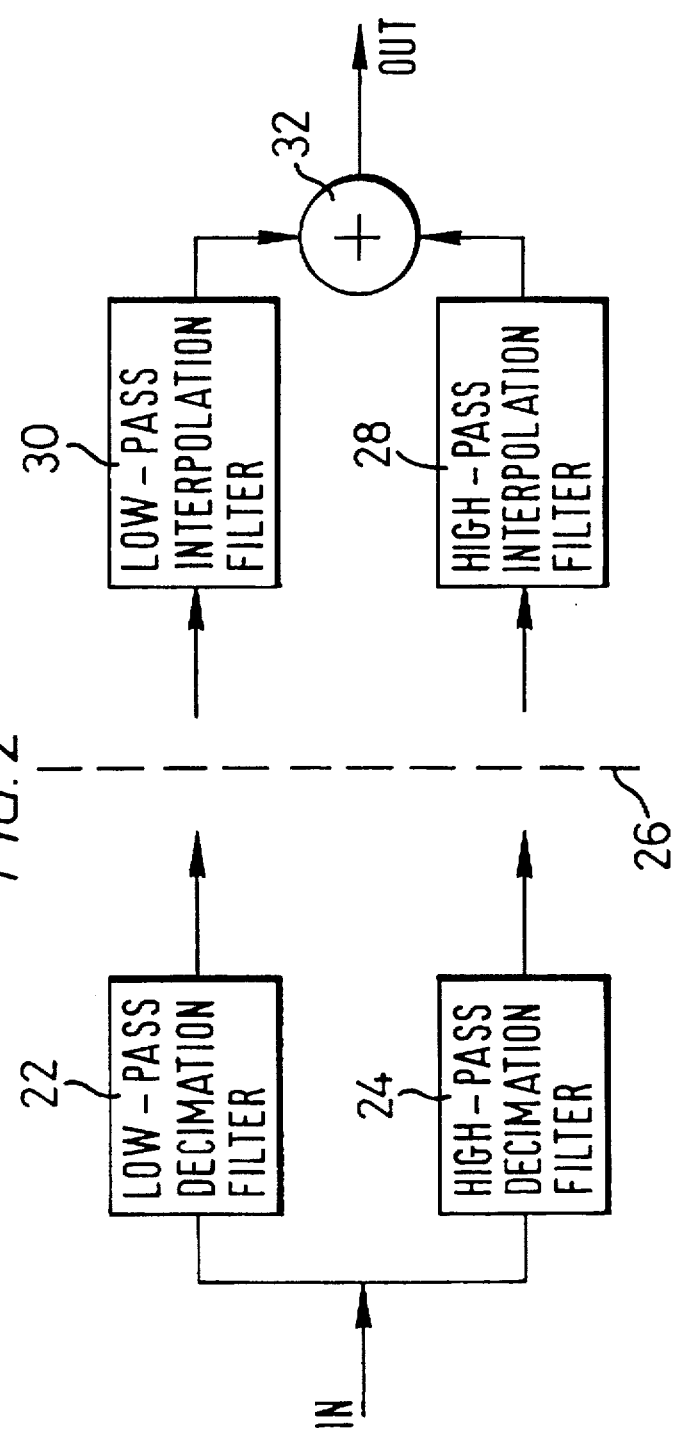

| 65 | 63 | 83 | 125 | 206 | 357 | 637 | 1166 |
| 61 | 67 | 88 | 133 | 217 | 373 | 663 | 1208 |
| 64 | 73 | 97 | 145 | 235 | 399 | 705 | 1276 |
| 73 | 84 | 111 | 163 | 261 | 438 | 766 | 1375 |
| 87 | 100 | 130 | 189 | 297 | 492 | 850 | 1511 |
| 107 | 122 | 157 | 224 | 346 | 565 | 961 | 1690 |
| 135 | 152 | 193 | 271 | 411 | 660 | 1108 | 1923 |
| 173 | 194 | 243 | 335 | 498 | 768 | 1298 | 2223 |

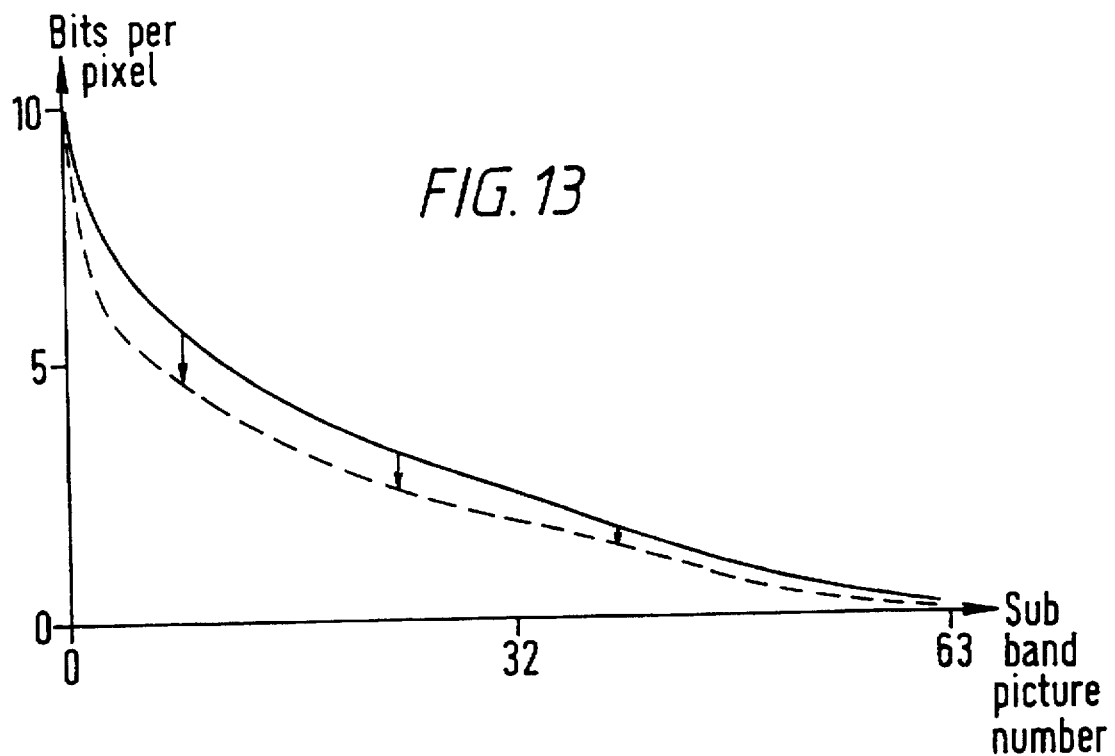

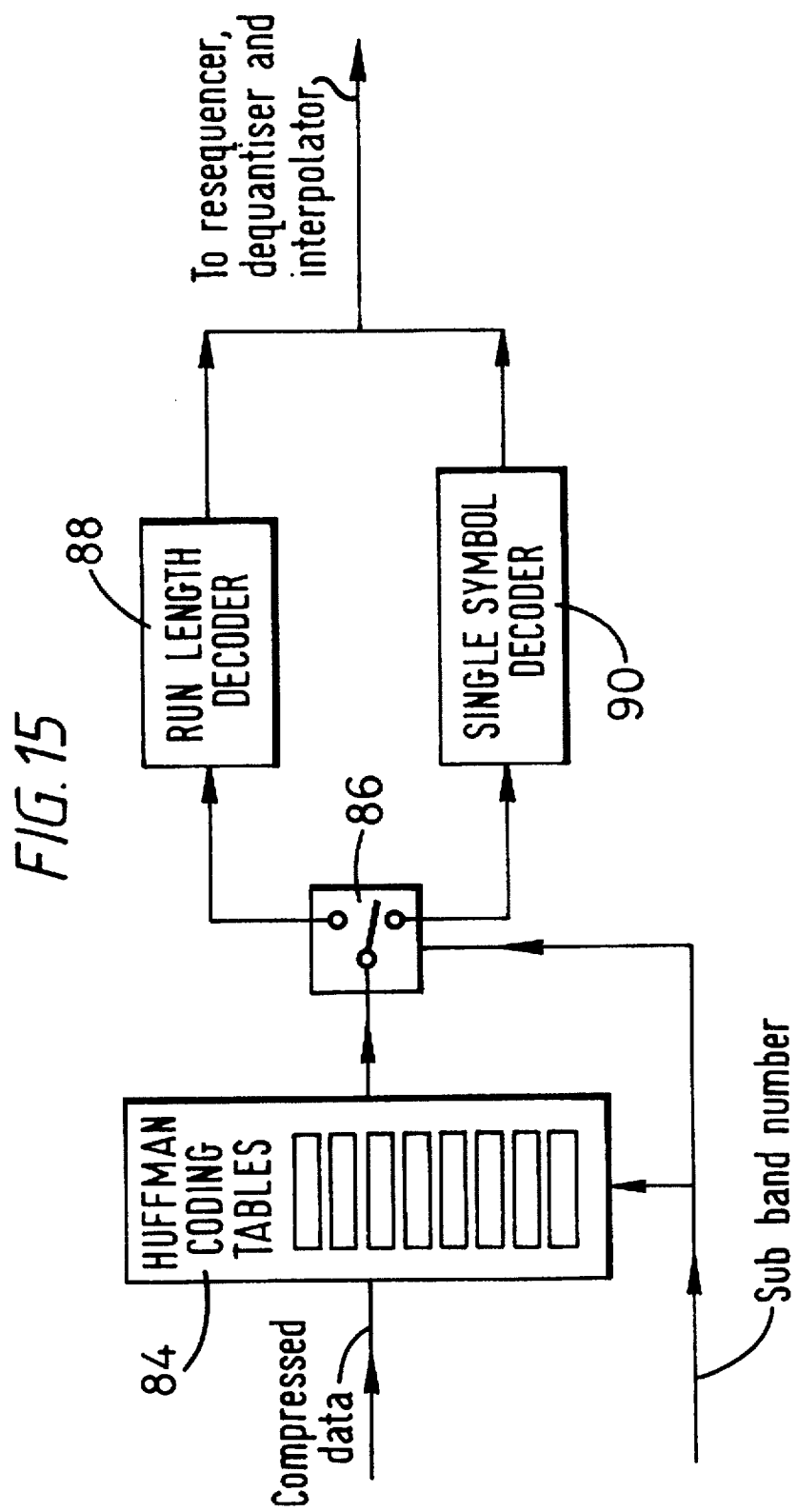

COMPRESSION OF IMAGE DATA SEPERATED INTO FREQUENCY COMPONENT DATA IN A TWO DIMENSIONAL SPATIAL FREQUENCY DOMAIN

BACKGROUND OF THE INVENTION

1. Field of the Invention

This invention relates to the field of data compression. More particularly, this invention relates to the field of data compression in which input data has been frequency separated by a decorrelator.

2. Description of the Prior Art

It is known to provide data compression systems in which input data is transformed to the frequency domain by decorrelation using techniques such as discrete cosine transformation (DCT) and sub band filtering. Transformation into the frequency domain often makes redundancy within the data easier to exploit using techniques such as quantisation and entropy encoding. An example of a system including such data compression is that proposed for image data by the Joint Photographic Experts Groups (JPEG) and currently under review by the International Standards Organisation.

The JPEG system uses DCT to transform portions of the image into the two-dimensional spatial frequency domain on a block-by-block basis, and produces a mixed stream of decorrelated data consisting of data values corresponding to different frequency components. The JPEG system applies pulse code modulation type entropy encoding to the dc component data values in the passing data stream, and variable length code type entropy encoding to the ac values in the passing data stream.

In contrast to the JPEG system, data compression techniques have been proposed in which decorrelated data for the entire image is collected into sets corresponding to different frequency component values. An example of such a system is sub band filtering in which the decorrelated data is collected into sets/sub pictures which correspond to different two-dimensional spatial frequency components of the full image. The format of the decorrelated data in such systems is most unlike that produced by the JPEG system.

It is a constant aim in data compression systems to increase the degree of compression achieved whilst preserving signal fidelity.

SUMMARY OF THE INVENTION

Viewed from one aspect the invention provides a data compression apparatus comprising:

i) a decorrelator for frequency separating input data into a plurality of sets of frequency component data, ii) an entropy encoder coupled to said decorrelator for receiving said plurality of sets of frequency component data from said decorrelator and for separately compressing said plurality of sets of frequency component data, iii) a plurality of coding tables usable by said entropy encoder for compressing said plurality of sets of frequency component data, and iv) means for selecting which one of said plurality of coding tables is used by said entropy encoder in dependence upon which of said plurality of sets of frequency component data is being compressed, so that each set of frequency component data is compressed by said entropy encoder using a coding table matched to said each set of frequency component data.

The invention recognises that by collecting together all the data values corresponding to each frequency component additional redundancy within the sets of frequency component data can be exploited. The sets of frequency component data share common intra-set data value characteristics. Compression is improved by matching the coding table of the entropy encoder to these characteristics.

It will be appreciated that the invention can be used with many different forms of input data providing they are suitable for decorrelation by frequency separation. However, in particularly preferred embodiments of the invention said input data is image data, and said decorrelator frequency separates in the two-dimensional spatial frequency domain. In such embodiments improvements of the order of twenty percent have been observed in the degree of compression achieved.

Correlation of the data values in the two-dimensional frequency domain within the sets of frequency component data may be utilised by including a data sequencer for controlling the order in which data from said sets of frequency component data is fed to said entropy encoder, said data sequencer varying said order between different sets of frequency component data. This allows the scan pattern of the sets of frequency component data to be adjusted to follow each particular spatial correlation.

In particular, said data sequencer controls the order in which data from sets of frequency component data corresponding to substantially zero spatial frequency in a first direction and non-zero spatial frequency in a second direction is fed to said entropy encoder following a path corresponding to a raster scan through said set of frequency component data with raster lines parallel to said first direction.

In addition, said data sequencer controls the order in which data from sets of frequency component data corresponding to non-zero spatial frequency in a first direction and non-zero spatial frequency in a second direction is fed to said entropy encoder following a path corresponding to a raster scan through said set of frequency component data with raster lines at an angle to both said first direction and said second direction.

Whilst a different coding table can be used for every set of frequency component data, implementation complexity can be reduced with only a slight loss in performance if said entropy encoder operates using one coding table to compress a group of said sets of frequency component data with similar data value characteristics.

Viewed from another aspect the invention provides a data compression method comprising the steps of:

i) frequency separating input data into a plurality of sets of frequency component data, ii) selecting a coding table from a plurality of coding tables in dependence upon which set of frequency component data is being compressed, each said coding table being matched to said set of frequency component data compressed using said coding table, and iii) compressing said set of frequency component data with an entropy encoder using said selected coding table.

A complementary aspect of the present invention is a data compression apparatus comprising:

i) an entropy decoder for separately decompressing a plurality of sets of frequency component data, ii) a plurality of coding tables usable by said entropy decoder for decompressing said plurality of sets of frequency component data, iii) means for selecting which one of said plurality of coding tables is used by said entropy encoder in dependence upon which of said plurality of sets of frequency component data is being decompressed, so that each set of frequency component data is decompressed by said entropy decoder using a coding table matched to said each set of frequency component data, and iv) an interpolator coupled to said entropy decoder for receiving said plurality of sets of frequency component data from said entropy decoder and for combining said plurality of sets of frequency component data to form an output signal.

It will be understood that a data signal produced with the apparatus or method of the present invention will inherently incorporate the features of the invention by virtue of its special and advantageous coding format.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 is a schematic illustration of a data compression system;

FIG. 2 is a schematic illustration of a simple sub band coding system;

FIG. 13 illustrates an improvement in the degree of data compression over different sub bands;

FIG. 14A illustrates the order in which sub bands are fed to the entropy encoder and FIG. 14B illustrates the grouping together of sub bands; and FIG. 15 illustrates an entropy decoder for use in a complementary decompression apparatus.

DESCRIPTION OF THE PREFERRED EMBODIMENTS

Figure 3:
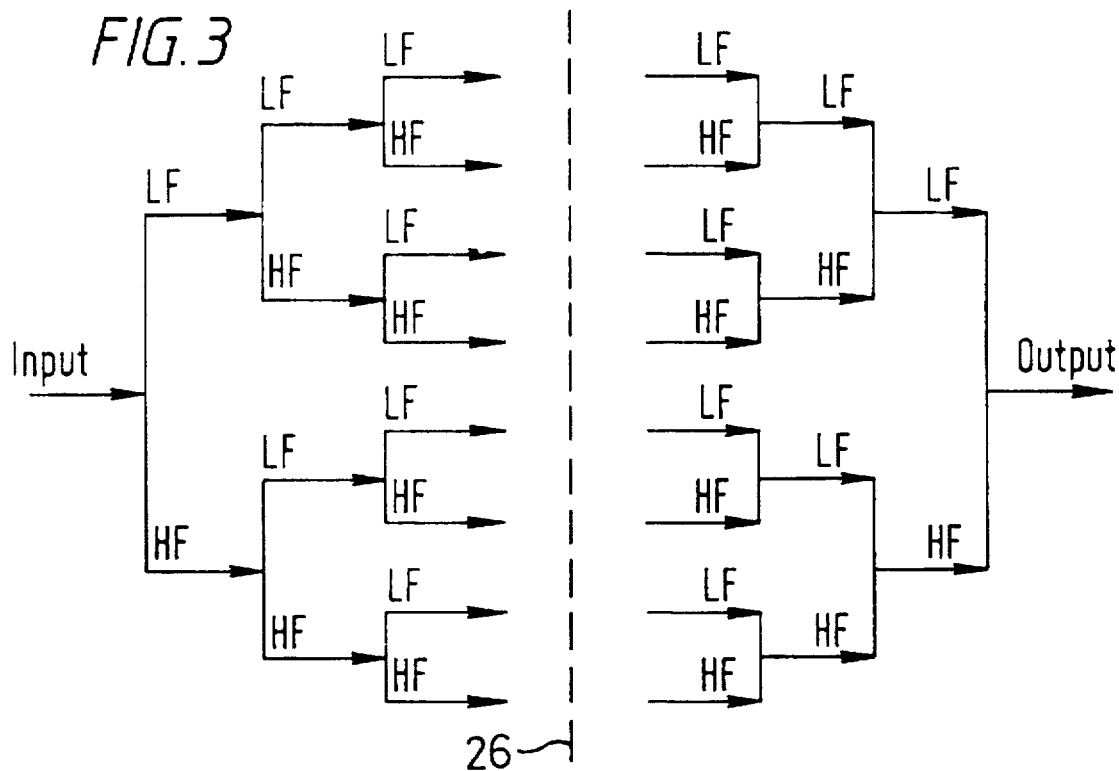
FIG. 3 is a schematic illustration of a higher order sub band coding system.

FIG. 1 shows an apparatus for effecting intra-image frequency separation and compression of a video signal in the two-dimensional spatial frequency domain. A video signal, which is in digital form and comprises successive multi-bit (for example 8-bit) samples or words each representing a respective pixel of a scanned image or picture, is applied via an input 10 to a decorrelator 12. A frequency separated video signal is outputted by the decorrelator 12 to a quantiser 14 and then via a data sequencer 18 to an entropy encoder 20, which together compress the frequency separated video signal outputted by the decorrelator 12 to produce a compressed signal at an output 19. The compressed signal can then be transmitted or stored. After transmission or storage, the compressed signal can be restored substantially to its original form by expansion by way of entropy decoding, resequencing, dequantising and correlation operations which employ parameters converse to those used for decorrelation, sequencing, quantisation and entropy encoding, respectively, upon compression.

The operation of decorrelation performed in the decorrelator 12 relies upon the fact that neighbouring pixels of an image are highly correlated, whereby processing an image (for example, a field or frame of a video signal) to form frequency separated signal portions representing different components of the image in the two-dimensional spatial frequency domain enables a reduction in the amount of information needed to represent the image. Specifically, the frequency separated signal portions represent different spatial frequency components of the image.

The sequencing operation will be described in more detail below.

The quantisation operation, which is a lossy operation, in that it involves deliberate discarding of some frequency data considered to be redundant or of little importance to adequate perception of the image by the human psychovisual system, in itself enables some signal compression to be achieved. The quantiser 14 enables compression to be achieved in two ways: it reduces the number of levels to which the data inputted to it can be assigned, and it increases the probability of runs of zero value samples on the data it outputs. The ability to achieve enhanced signal compression provided by the operation of the quantiser is carried into effect in the entropy encoder 20 in that the reduction in information content achieved in the quantiser 14 enables a consequential bit (data) rate reduction to be achieved in the entropy encoder.

Further (non-lossy) compression, and bit (data) rate reduction, are provided in the entropy encoder 16 in which, in known manner, using for example variable length coding, the data produced by the quantiser 14 is encoded in such a manner that more probable (more frequently occurring) items of data produce shorter output bit sequences than less probable (less frequently occurring) ones. In this regard, the decorrelation operation has the effect of changing the probability distribution of the occurrence of any particular signal level, which is substantially the same as between the different possible levels before decorrelation, into a form in which in which it is much more probable that certain levels will occur than others.

The compression/coding system or apparatus as shown in FIG. 1 can be embodied in a variety of ways, using different forms of decorrelation. An increasingly popular form of implementation makes use of so-called transform coding, and in particular the form of transform known as the discrete cosine transform. The use of discrete cosine transformation for decorrelation is in fact prescribed in a version of the compression system of FIG. 1 described in a proposed standard prepared by the Joint Photographic Experts Group and currently under review by the International Standards Organisation. According to the transform technique of decorrelation, the signal is subjected to a linear transform (decorrelation) operation prior to quantisation and encoding. A disadvantage of the transform technique is that, although the whole image (for example, a whole field) should be transformed, this is impractical in view of the amount of data involved. The image (field) thus has to be divided into blocks (for example, of 8×8 samples representing respective pixels), each of which is transformed. That is, transform coding is complex and can be used on a block-by-block basis only.

A recently proposed approach to compression/coding in the frequency domain is that of sub-band coding. In this approach, the decorrelator 12 in the system of FIG. 1 would comprise a spatial (two-dimensional) sub-band filtering arrangement which divides the input video signal into a plurality of uncorrelated sub-bands each containing the spatial frequency content of the image in a respective one of a plurality of areas of a two-dimensional frequency plane of the image, the sub-bands then being selectively quantised by the quantiser 14 in accordance with their positions in the sensitivity spectrum of the human psychovisual system. That is, decorrelation is achieved in this case by putting the energy of the overall image into different sub-bands of the two-dimensional spatial frequency domain. Sub-band filtering is believed to provide better decorrelation than the transform approach. Also, unlike the transform technique, there is no restriction to operation on a block-by-block basis: the sub-band filtering can be applied directly to the video signal.

FIG. 2 illustrates a sub-band coding system in which the input video signal is passed through a low-pass decimation filter 22 and a high-pass decimation filter 24. The resulting two output signals represent different portions of the frequency spectrum of the input signal. The two signals are then quantised, sequenced and entropy encoded as discussed in relation to FIG. 1. The sub-band components of the input signal can now be transmitted or stored for later reproduction. The storage or transmission of the sub-band components is illustrated by the dashed line 26 in FIG. 2.

When the sub-band components are recovered from, for example, a recording medium, they are passed through corresponding matching filters to regenerate the original frequency components. These matching filters are a low-pass interpolation filter 30 and a high-pass interpolation filter 28. The outputs of the interpolation filters 28, 30 are added by a summation circuit 32 to yield the original video input signal.

FIG. 2 illustrates the decomposition of the input video signal into two sub-bands. In practice, the input video signal would be decomposed into many more sub-band components. FIG. 3 illustrates the decomposition of an input signal into eight sub-band components and its subsequent recombination into an output video signal.

The filters of the sub-band coding system comprise finite impulse response filters with appropriate delays and weighting coefficients to perform both horizontal and vertical frequency decomposition. Different forms of filters for performing sub-band frequency separation are known, e.g. some possible filters are described in the article entitled 'Exact Reconstruction Techniques for Tree Structured Sub-Band Coders', in IEEE Transactions on Acoustics, Speech and Signal Processing. Volume ASSP-34 at pages 434 to 441, June 1986.

Figure 4:
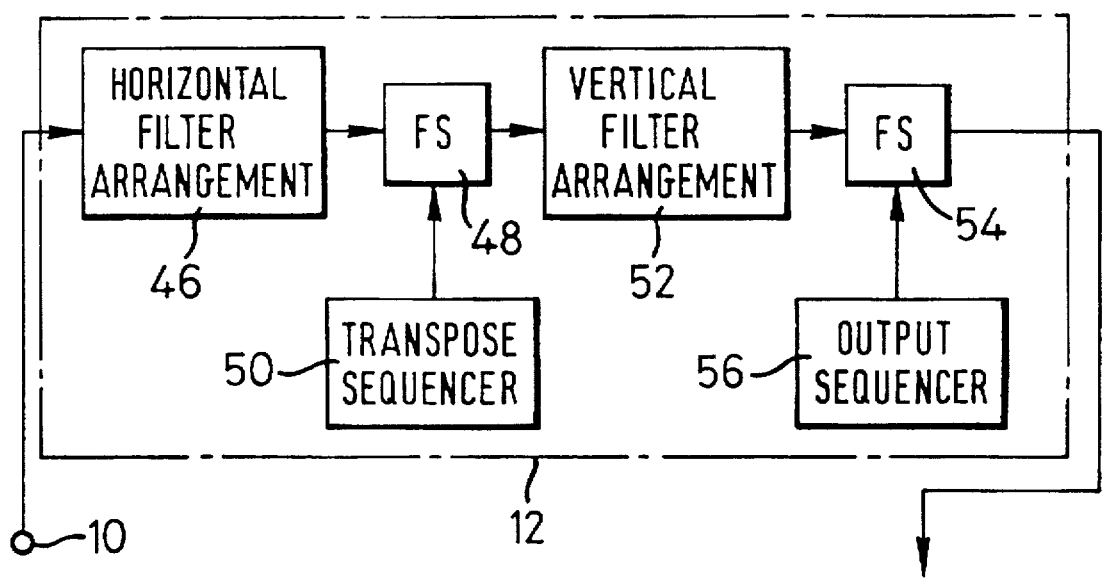
FIG. 4 illustrates a two-dimensional sub band decorrelator.

FIG. 4 illustrates the decorrelator 12 of FIG. 2 in more detail. The decorrelator comprises a horizontal filter arrangement 46, an intermediate field store 48, a transpose sequencer (address generator) 50, a vertical filter arrangement 52, an output field store 54 and an output sequencer (address generator) 56. Sub-band filtering is effected on a separable basis. Thus, in FIG. 4, filtering in the two orthogonal image directions, namely the horizontal direction (the direction of image scanning in the case of conventional video) and the vertical direction, is effected entirely independently and separately of one another by respective one-dimensional filtering operations performed in the horizontal and vertical filter arrangements 46 and 52, respectively.

The horizontal filter arrangement 46 and vertical filter arrangement 52 can be of substantially the same construction as one another. Thus, the construction of the horizontal filter arrangement 46 only will be described in detail. The filtering is to achieve 8 sub-bands in each of the horizontal and vertical directions, that is to say that a square array of 64 (8×8) sub-bands is to be produced. The 64 sub-bands are to be of equal extent to one another.

The horizontal filter arrangement 46 is preferably of a tree or hierarchical structure as shown in FIG. 3, comprising three successive filter stages. The first stage comprises a low pass filter (LF) and a high pass filter (HF), each of which is followed by a respective decimator (not shown). The LF filter, HF filter and the decimators together make up a quadrature mirror filter (QMF). Each of the filters can be a finite impulse response filter of conventional form. In use, a line of a field of the input digital video signal is applied, sample-by-sample, to the first stage, to be low pass filtered and high pass filtered by the LP and HF, respectively. Thus, the LF and HF produce outputs comprising low pass filtered and high pass filtered versions of the input line, respectively, the outputs representing the spatial frequency content of the line in the upper and lower halves of the horizontal spatial frequency range. That is, the first stage divides the input line into two sub-bands in the horizontal direction. The decimators decimate (sub-sample) the respective outputs by a factor of two, whereby the total number of samples outputted by the decimators (together) is the same as the total number of samples in the line.

The second stage is of similar construction to the first stage, except that there are two QMFs each as in the first stage and the output from each of the decimators of the first stage is passed as an input to a respective one of the two QMFs. Thus, the second stage produces four outputs representing the spatial frequency content of the line in four equal quarters of the horizontal spatial frequency range. That is, the second stage further divides the two sub-bands, into which the input line was divided in the first stage, into four sub-bands in the horizontal direction. The four decimators of the second stage decimate (sub-sample) the respective outputs by a factor of two, whereby the total number of samples outputted by the decimators of the second stage (together) is the same as the total number of samples in the line.

The third stage is of similar construction to the first stage, except that there are four QMFs each as in the first stage and the output from each of the four decimators of the second stage is passed as an input to a respective one of the four QMFs. Thus, the third stage produces eight outputs representing the spatial frequency content of the line in eight equal one-eighths of the horizontal spatial frequency range. That is, the third stage divides the four sub-bands into which the input line was previously divided into the required eight sub-bands in the horizontal direction. The eight decimators of the third stage decimate (sub-sample) the respective outputs by a factor of two, whereby the total number of samples outputted by the decimators of the third stage (together) is the same as the total number of samples in the line.

The eight outputs of the third stage, that is of the horizontal filter arrangement 46, are passed to the intermediate field store 48 and stored at positions corresponding to respective one-eighths of a first line thereof. The above process of horizontal filtering is then repeated for all the other lines of the field of the input digital video signal. This results in the intermediate field store 48 containing a version of the field of the input digital video signal that has been filtered into eight sub-bands in the horizontal direction (only). Each line of the field stored in the intermediate field store 48 is divided into eight portions each containing the horizontal spatial frequency information in a respective one of eight sub-bands of the horizontal spatial frequency range of the image that the original field represented. Thus, the horizontally filtered field stored in the intermediate field store 48 can be considered to be divided into eight columns.

The horizontally filtered field stored in the intermediate field store 48 is then fed (under the control of the transpose sequencer 50) into the vertical filter arrangement 52, in which it is filtered into eight sub-bands in the vertical direction in similar manner to that in which filtering into eight sub-bands in the horizontal direction was achieved in the horizontal filter arrangement 46. The horizontally and vertically filtered field is fed on a line-by-line basis into the output field store 54 to be passed from there to the quantiser 14. The store 56 can be considered to have been partitioned into an array of 64 (8×8) storage regions, in each of which a respective one of the 64 sub-bands is stored. Thus, successive fields of the input digital video signal are sub-band filtered and passed, duly filtered, to the quantiser 14 after a delay of two field intervals.

The transpose sequencer 50 produces read addresses for the intermediate field store 48, to control reading of the contents thereof into the vertical filter arrangement 52, as follows. As will be recalled, the signal as stored in the intermediate field store 48 comprises the lines of the original field, each divided horizontally into eight sub-bands. That is, the signal as stored in the intermediate field store 48 can, as mentioned above, be considered to comprise eight columns. To enable the signal stored in the intermediate field store 48 to be vertically filtered by hardware of the same construction (the vertical filter arrangement 52) used to horizontally filter it, it must be transposed, that is rotated through 90 degrees, as it is read to the vertical filter arrangement 52, so that it comprises eight rows (as opposed to columns). The transpose sequencer 50 addresses the intermediate field store 48 in such a manner as to accomplish this.

The nature of the filtering produced by the combination of the horizontal filter arrangement 46 and the vertical filter arrangement 52 is such that data stored in the output field store 54 is somewhat scrambled and reordered by the output sequencer 56 before being passed to the rest of the apparatus for processing.

Figure 5:
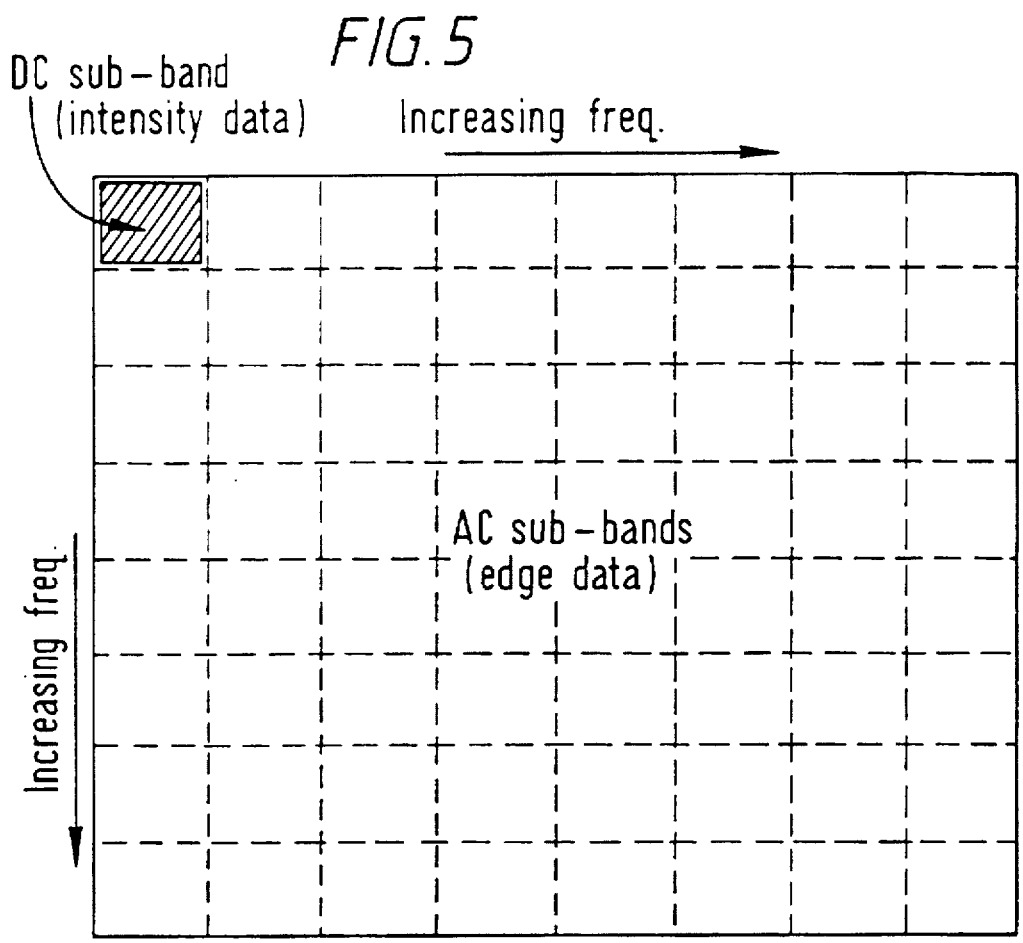
FIG. 5 illustrates a frequency separated video signal.

FIG. 5 illustrates the various sub band components produced if the input video signal is decomposed both horizontally and vertically into eight frequency components (this can be considered to be the data stored in the output field store 54 after it has had the reordering of the output sequencer 56 applied to it). Each of these sub bands or sub-pictures is represented by one of the blocks in FIG. 5. The upper left hand block represents the dc sub-band. This is the band of lowest horizontal and vertical frequency although in practice it does not necessarily represent only the constant portions of the signal with strictly zero frequency. This dc sub-band will contain the majority of the dc luminance information of the original input video signal. The relative importance of the remaining sub-bands to the eventual perception of the picture by a viewer varies. Generally speaking, the higher frequency sub-bands are less important to the eventual perception of a viewer. In relation to FIG. 5, the frequency which a particular sub-band component represents increases in moving downward and/or rightward in the array of blocks.

Figure 6:
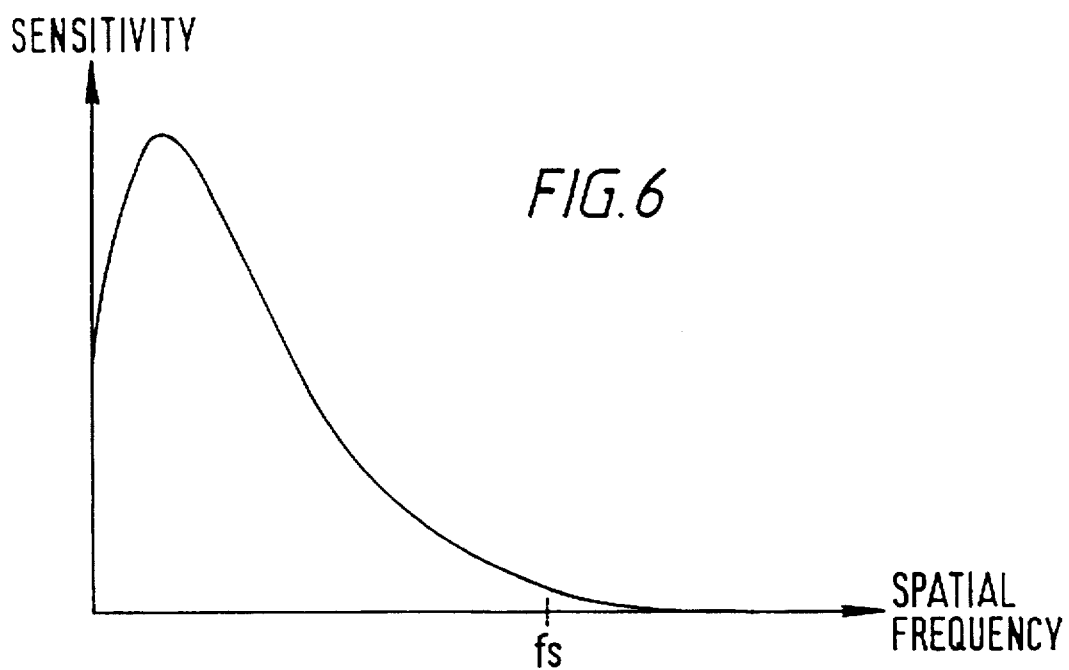
FIG. 6 illustrates the human psychovisual response to images of differing spatial frequency.

FIG. 6 illustrates the human psychovisual response to image components of differing spatial frequency. As can be seen, the level of human perception first rises and then steadily diminishes with increasing spatial frequency. This characteristic can be exploited in a data compression system with the realisation that components of higher spatial frequency can be subjected to higher degrees of quantisation with subsequent loss in information, without significantly degrading the perceived image that can be reconstructed.

Figures 7, 8:
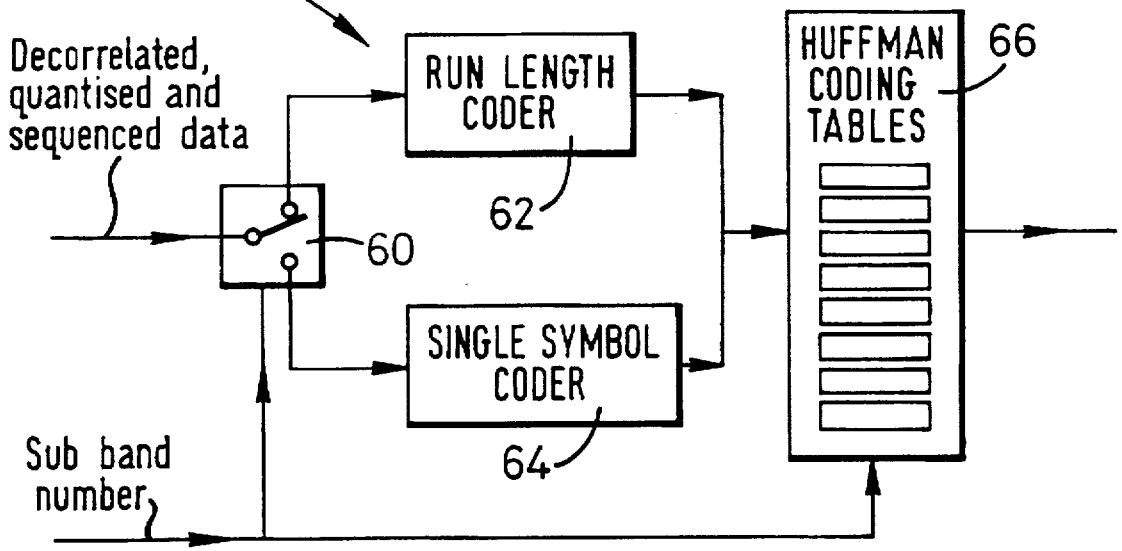
FIG. 7 is a quantisation matrix.
FIG. 8 illustrates an entropy encoder operating with a plurality of coding tables.

FIG. 7 shows a quantisation matrix that can be applied to the differing sub bands of FIG. 5 by the quantiser 14 of FIG. 1. The way in which the quantiser operates is that each value within each sub band block is divided by the corresponding quantisation value and then the integer value of the result is taken. Thus, if a value of 30 was read from the dc luminance sub band in the top left hand corner, this would be divided by the corresponding quantisation value of 65 and the integer value taken giving a quantised result of zero. Similarly, if a value of 80 were read from the dc luminance sub band and divided by 65, the resulting integer value would be one.

It will be seen that the lowest quantisation values occur in the bands below and slightly to the right of the dc luminance sub band. This is because the human visual system is most responsive to these sub bands. The values for the quantisation matrix can be determined by a process of trial and error with subjective viewing tests to see which values gives the best perceived image. Alternatively, values can be derived by extending the curve of FIG. 6 into three dimensional form to produce a curved surface. The surface is the locus of the curve of FIG. 6 rotated through 90° about the sensitivity axis. The sub band frequency blocks lie in different regions of the spatial frequency plane beneath this surface, and by integrating under the surface to find the volume between each frequency block and the surface then a relative quantisation value can be determined.

The different quantisation values from the matrix of FIG. 7 serve to impose a decreasing information content upon the higher sub band frequency components. This results from the fact that the higher sub-band frequency components have correspondingly higher quantisation values and so when a data value is read from one of these higher bands it will be divided by a correspondingly larger number before having its integer value taken. Thus, even if one were to assume that each of the sub bands contained the same amount of information prior to quantisation, then the data from the higher frequency sub bands would result in a reduced span of quantised data values due to the higher quantisation matrix numbers. In practice, the information content of the higher sub band frequency components is lower than the lower sub band frequency components even prior to quantisation.

FIG. 8 shows the entropy encoder 20 of FIG. 1 in more detail. Data which has been decorrelated by the decorrelator 12, quantised by the quantiser 14 and sequenced by the data sequencer 18 is fed to a coding switch 60. The coding switch 60 is responsive to an input of sub band number to direct the data stream to either a run length coder 62 or a single symbol coder 64. The output from both the run length coder 62 and the single symbol coder 64 is fed to a Huffman coding unit 66. The Huffman coding unit 66 applies one of a plurality of different coding tables to the data it receives in dependence upon the sub band number with which it is also supplied.

The techniques of run length coding, single symbol coding and Huffman coding are described in the book "Coding and Information Theory" by R W Hamming, Prentice-Hall, 1980, ISBN 0-13-139139-9. Huffman coding is a technique whereby having identified a number of events, the relative frequency of these events is analyzed and a code of an appropriate length ascribed to each event depending upon its relative frequency within the data stream. Events which are most likely to occur are given short codes, and events which are unlikely to occur are given longer codes. In this way, a coding table matched to the relative probabilities of the events to be encoded is produced, with a consequent increase in data compression efficiency.

In the case of the present invention the relative probabilities of differing events occurring within each sub band are analyzed and a Huffman coding table for each sub band is produced. It has been found in practice that the data value characteristics of the lower frequency sub bands vary significantly. However, as the frequency increases, the amount of variation decreases. Accordingly, to improve implementation efficiency, the sub bands can be organised into groups of differing sizes each with its own Huffman coding table.

Figure 9:
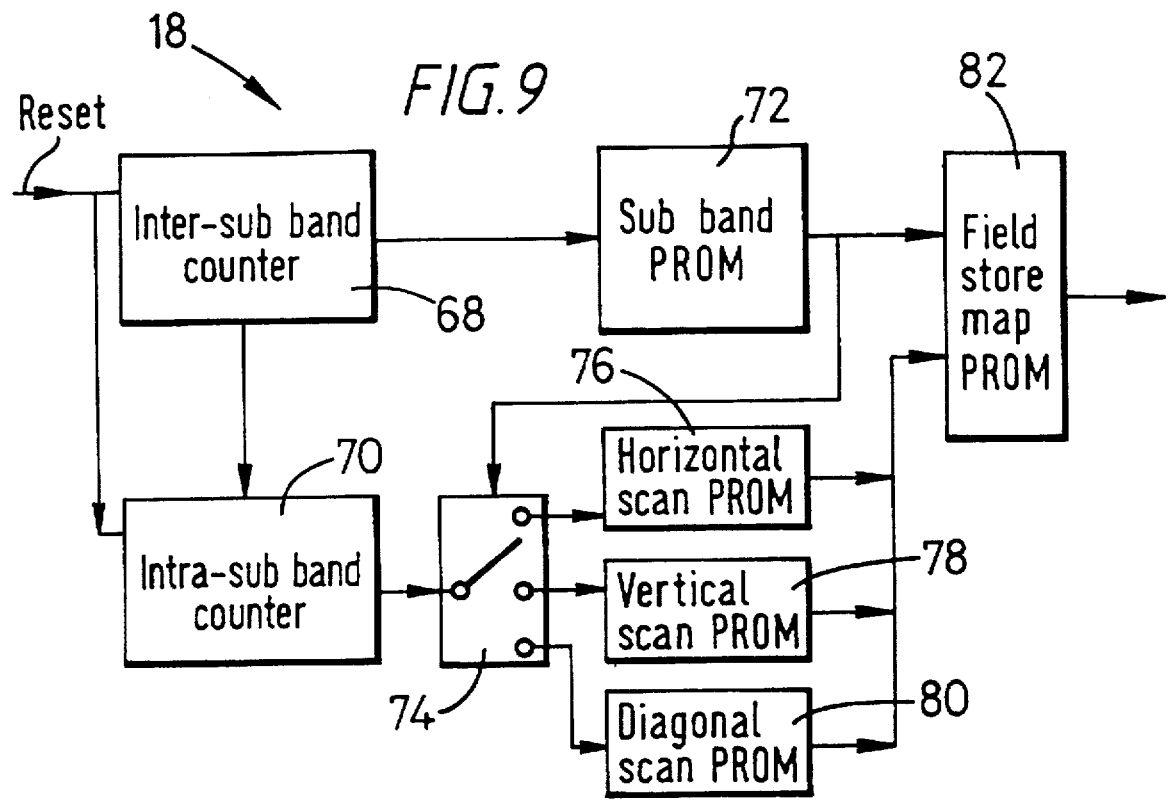
FIG. 9 illustrates a data sequencer for controlling the scan path through each sub band.

FIG. 9 illustrates the data sequencer 18 from FIG. 1 in more detail. The function of the data sequencer 18 is to feed the data values that have been decorrelated, quantised and stored in a field store (not illustrated) to the entropy encoder 20 in the most appropriate order. The data sequencer 18 includes an inter-sub band counter 68 and an intra-sub band counter 70. The inter-sub band counter 68 counts a repeating sequence of values 0–63, one sequence for each image to be compressed. For each increment in the inter-sub band counter 68 the intra-sub band counter 70 completes a sequential count with a span equal to the number of data values within each sub band.

The output from the inter-sub band counter 68 is fed to a sub band programmable read only memory (PROM) 72 where it is mapped from a simple sequential count into the order in which the different sub bands are to be fed to the entropy encoder 20. The output from the sub band PROM 72 is fed to a scanning switch 74. The pattern in which a sub band is scanned varies in dependence upon which sub band it is. The scanning switch 74 feeds the output of the intra-sub band counter 70 to the appropriate one of a horizontal scan PROM 76, a vertical scan PROM 78 and a diagonal scan PROM 80. The respective scan PROMs map the sequential intra-sub band count into the appropriate sequence of points within each sub band to bring about their respective scan patterns.

Figure 10:
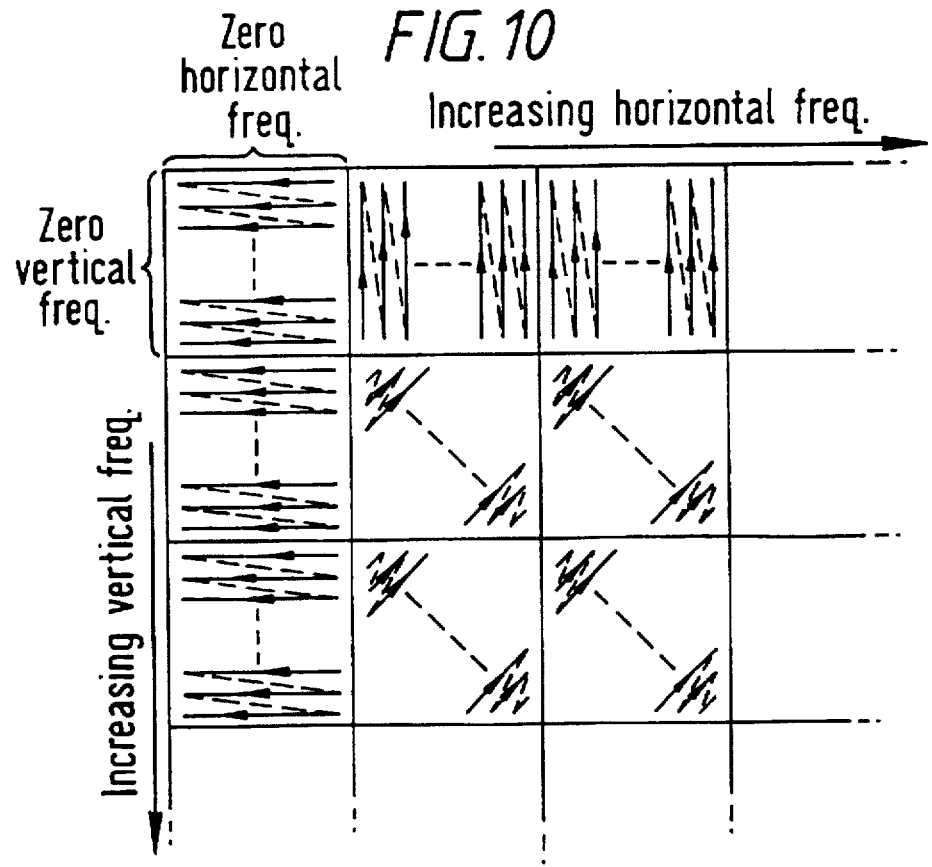
FIG. 10 illustrates the scan paths used for different sub bands.

The output from the sub band PROM 72 and the output from the currently active scan PROM are fed to a field store map PROM 82 where a mapping to a physical address within the field store where the data values are held is carried out. The output of the field store map 82 is used to address the field store where the data values are held and thereby sequence them for feeding to the entropy encoder 20. FIG. 10 illustrates the different scan patterns for different sub bands. The dc sub band is subject to a horizontal scan pattern. The ac sub bands of zero horizontal frequency and non-zero vertical frequency are also subject to a horizontal scan, i.e. a raster scan in which the raster direction is parallel to the direction in which the sub band has a zero spatial frequency. The ac sub bands of zero vertical frequency and non-zero horizontal frequency are, in contrast, subject to a vertical scan. The ac sub bands with non-zero horizontal and vertical frequencies are subjected to a diagonal scan pattern. The reasons why these different scan patterns are advantageous for particular sub bands will be described below in relation to FIGS. 11 and 12.

Figure 11:
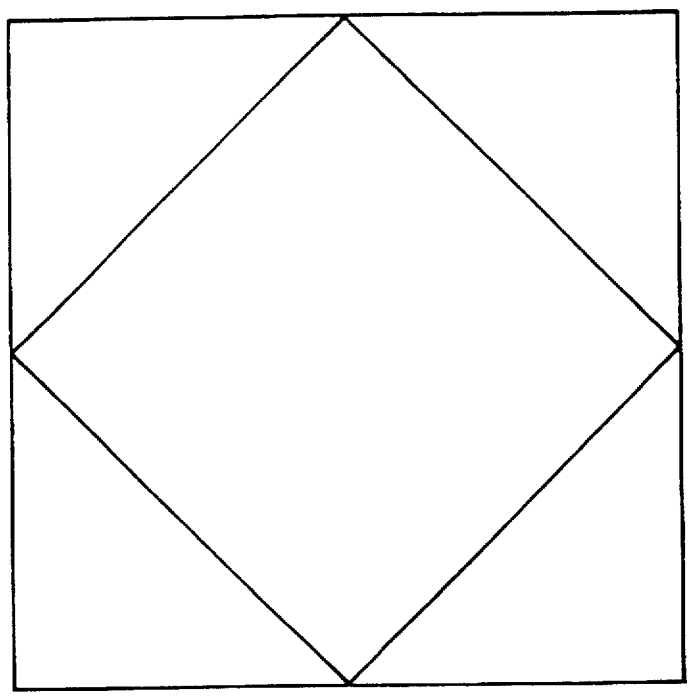
FIG. 11 is a sample image to be compressed.

FIG. 11 shows a sample image for compression. This image is particularly simple, but includes horizontal, vertical and diagonal lines for the purpose of demonstrating how these lines produce different forms of spatial correlation within the different sub bands.

Figure 12:
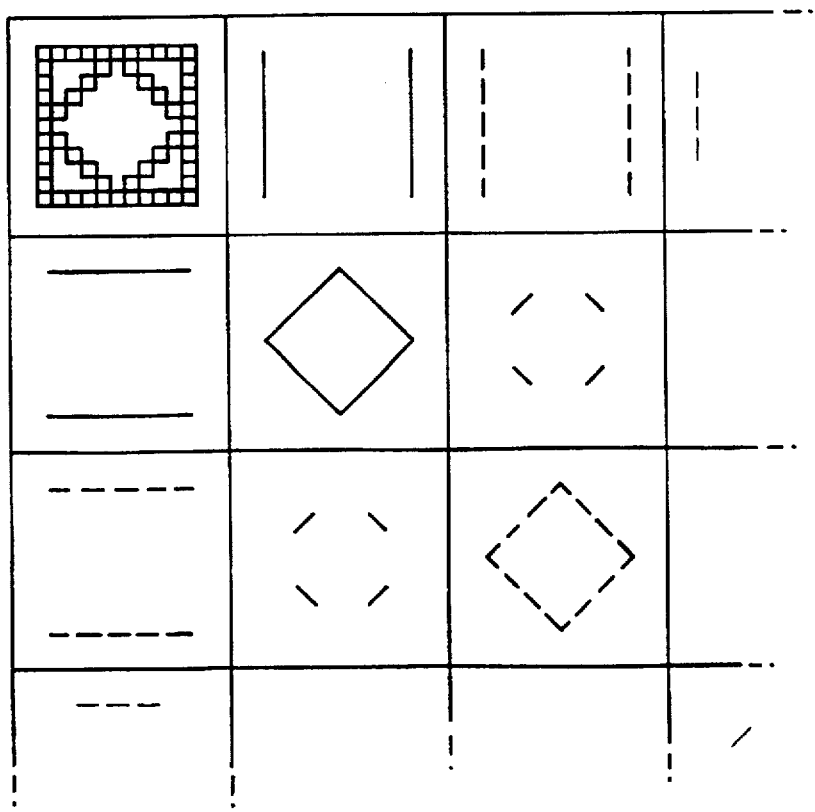
FIG. 12 illustrates the most significant sub bands produced from the sample image of FIG. 11.

FIG. 12 schematically illustrates the sub band data produced upon decorrelation of the image of FIG. 11. The sub bands illustrated in FIG. 12 correspond to those illustrated in FIG. 10.

The dc sub band shows the dc components of the image of FIG. 11 being a rather low resolution representation of the complete image. As discussed earlier, the dc sub band contains a relatively large amount of information concerning the decorrelated image and is particularly important to the reproduction of a high quality image.

The sub bands of zero vertical frequency show an interesting phenomenon whereby vertical lines within the source image are picked out as sequences of non zero values within the sub band. This effect diminishes with increasing horizontal frequency.

Similarly the sub bands of zero horizontal frequency have picked out the horizontal lines within the source image, and the sub bands of the non zero horizontal and vertical frequency have picked out the diagonal lines from the source image.

If the different sub bands are scanned with a path which will run parallel to the features picked out in each sub band, then the probability of occurrence of long run lengths will be increased. Longer run lengths produce better compression. It is of note that the sub bands of non zero spatial frequency in both directions have picked out all of the diagonal lines, but a diagonal scan path can only exploit the diagonal spatial correlation within these sub bands in a single direction. In summary, the decorrelated and quantised data is fed to the entropy encoder 20 where it is subject to an entropy coding operation matched to its particular data characteristics. The intra-sub band order in which the data values from each sub band are fed to the entropy encoder is also specially controlled to increase the degree of compression.

FIG. 13 is an example illustrating the order of improvement in compression that can be achieved with the invention. The solid line illustrates the average bits per pixel value for each sub band before adopting the invention. The dashed line illustrates the average bits per pixel value achieved after adopting the invention. There is little improvement for the dc sub band (sub band picture number 0). The ac sub bands show a more or less consistent improvement of about 20% each in the degree of compression achieved. It will be understood that the degree of compression achieved and the improvement produced by the invention will vary considerably between different image. Some images are highly correlated and suitable for compression, whereas other images either contain a great deal of information or are just unmatched with the data compression technique used and produced relatively little overall compression.

FIG. 14A illustrates the order in which the different sub bands are fed to the entropy encoder. This order is roughly derived from the relative size of the quantisation values of FIG. 7. The order of FIG. 14A has not however been adjusted to reflect the relative importance of the dc chrominance sub bands. The order shown in FIG. 14A is brought into effect by the mapping performed in the sub band PROM 72.

As previously discussed, an individual Huffman coding table can be produced for each sub band, but since the higher frequency ac sub bands differ little in data value characteristics they can be grouped together to increase implementation efficiency. FIG. 14B shows how the sub bands are arranged into different groups. The size of the groups increases as ac spatial frequency increases.

FIG. 15 illustrates a complementary aspect of the invention. i.e. a corresponding decompression apparatus. The compressed data is fed to a Huffman decoding unit 84 which contains the same coding tables as in the Huffman coding unit 66. The coding table used for each different sub band is changed in dependence upon the input of sub band number to correspond to the same coding table that was used upon its encoding. The output from the Huffman decoding unit 84 is fed to a decoding switch 86. The decoding switch 86 feeds the signal to the appropriate one of the run length decoder 88 or single symbol decoder 90 in dependence upon the sub band number. The decoded output is then fed to a resequencer, dequantiser and interpolator. The resequencer, dequantiser and interpolator are chosen to have the inverse effect of the corresponding sequencer, quantiser and decorrelator.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data compression apparatus comprising:

a decorrelator for frequency separating input data in a two-dimensional spatial frequency domain and including first filtering means for frequency separating said input data in a primary direction into separated data, transposing means for transposing said separated data to produce transposed data, and second filtering means for frequency separating said transposed data in a secondary direction into a plurality of sets of frequency component data, an entropy encoder receiving said plurality of sets of frequency component data from said decorrelator for separately compressing said plurality of sets of frequency component data, a plurality of coding tables selectively usable by said entropy encoder in said compressing of said plurality of sets of frequency component data, and means for selecting one of said plurality of coding tables for use by said entropy encoder in dependence upon which of said plurality of sets of frequency component data is being compressed, so that each set of frequency component data is compressed by said entropy encoder using a coding table matched to said each set of frequency component data.

2. A data compression apparatus as claimed in claim 1, wherein said input data is image data, and said primary direction is orthogonal to said secondary direction.

3. A data compression apparatus as claimed in claim 1, further comprising a data sequencer for controlling an order in which data from said plurality of sets of frequency component data is supplied to said entropy encoder, said data sequencer varying said order in dependence upon which of said plurality of sets of frequency component data is being supplied to said entropy encoder.

4. A data compression apparatus as claimed in claim 3, wherein said data sequencer controls said order so that data from each set of said plurality of sets of frequency component data corresponding to a group of lowest spatial frequencies in a first direction and frequencies other than said group of lowest spatial frequencies in a second direction are supplied to said entropy encoder following a path corresponding to a raster scan through said each set of frequency component data with raster lines parallel to said first direction.

5. A data compression apparatus as claimed in claim 3, wherein said data sequencer controls said order so that data from each set of said plurality of sets of frequency component data corresponding to non-zero spatial frequency in a first direction and non-zero spatial frequency in a second direction is supplied to said entropy encoder following a path corresponding to a raster scan through said each set of frequency component data with raster lines at an angle relative to both said first direction and said second direction.

6. A data compression apparatus as claimed in claim 1, wherein said entropy encoder uses one coding table to compress a group of said sets of frequency component data with similar frequency component data characteristics.

7. A data compression apparatus as claimed in claim 1, wherein said first filtering means has the same construction as said second filtering means.

8. A data compression method comprising the steps of:

frequency separating input data in a primary direction into separated data, transposing said separated data to produce transposed data, frequency separating said transposed data in a secondary direction into a plurality of sets of frequency component data, selecting a coding table from a plurality of coding tables in dependence upon which set of frequency component data is being compressed so that said coding table is matched to said set of frequency component data being compressed, and compressing each set of frequency component data by entropy encoding said frequency component data on the basis of the selected coding table.

9. A compressed data signal compressed by frequency separating input data in a primary direction into separated data, transposing said separated data to produce transposed data, frequency separating said transposed data in a secondary direction into a plurality of sets of frequency component data, selecting a coding table from a plurality of coding tables in dependence upon which set of frequency component data is being compressed so that said coding table is matched to said set of frequency component data being compressed, and compressing each set of frequency component data by entropy encoding said frequency component data on the basis of the selected coding table so as to produce said compressed data signal.

* * * * *